UNITED STATES PATENT OFFICE.

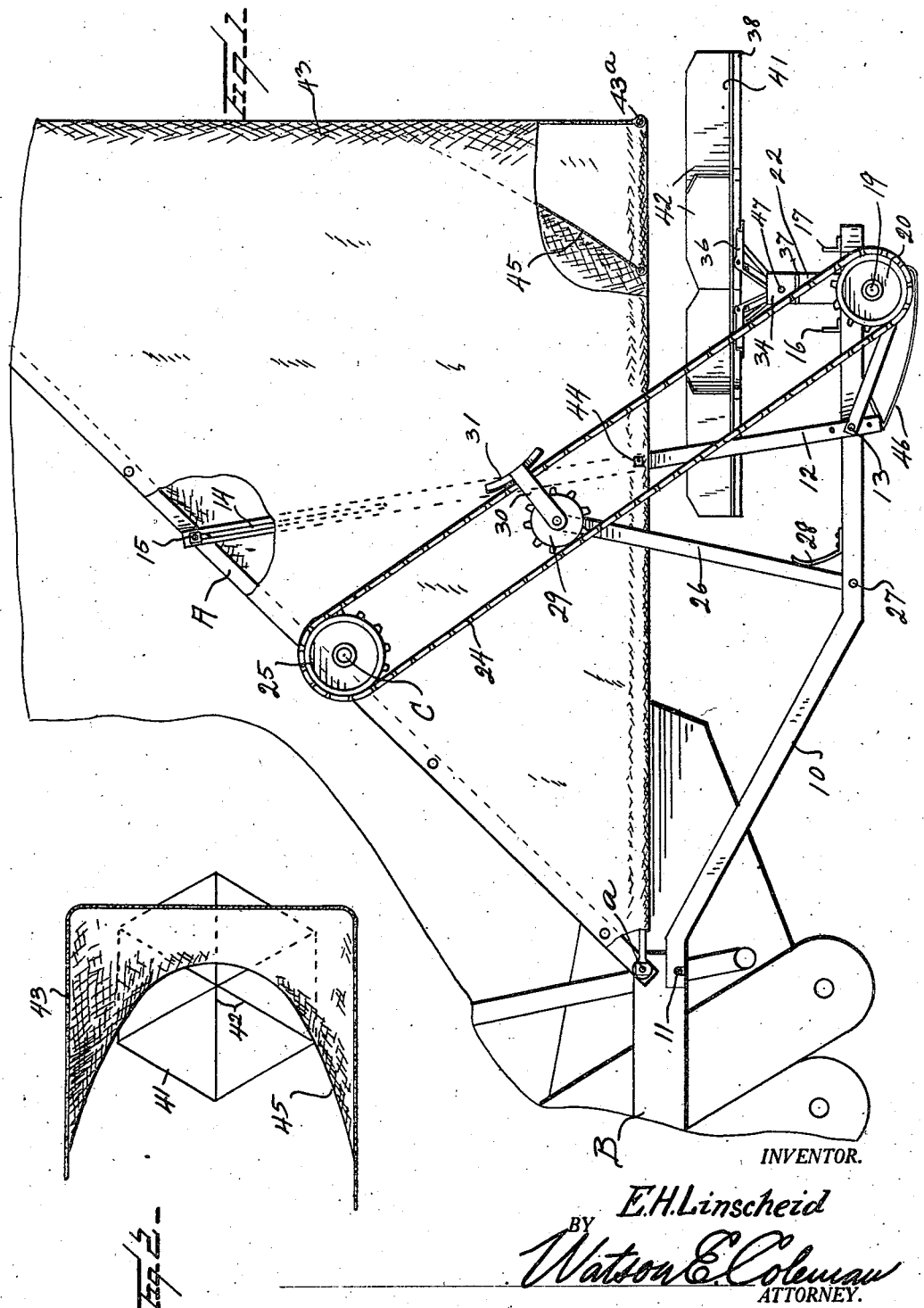

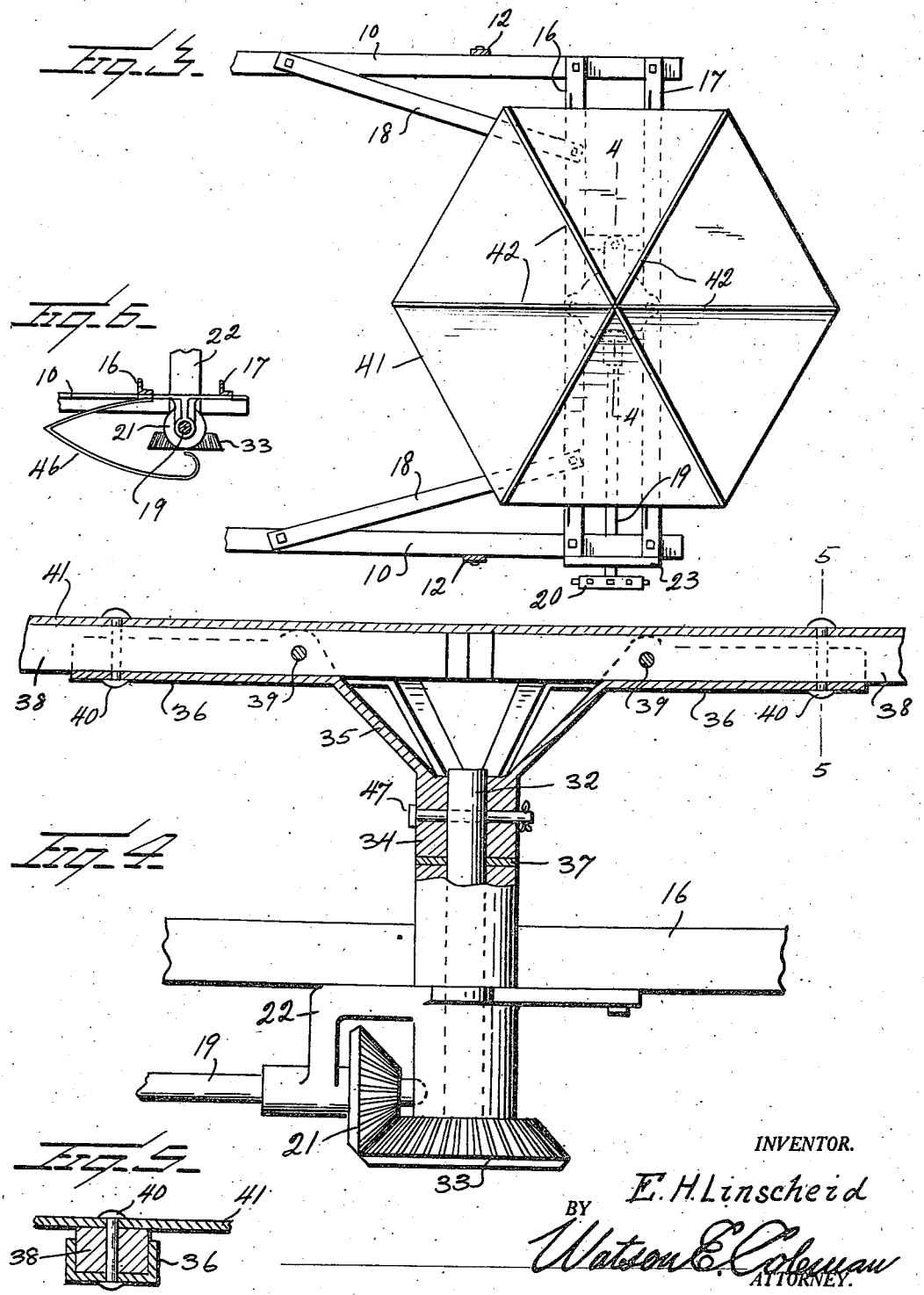

EDWARD H. LINSCHEID, OF ARLINGTON, KANSAS.

STRAW SPREADER FOR HARVESTER THRASHERS.

1,420,716.      Specification of Letters Patent.    Patented June 27, 1922.

Application filed September 15, 1920. Serial No. 410,366.

*To all whom it may concern:*

Be it known that I, EDWARD H. LINSCHEID, a citizen of the United States, residing at Arlington, in the county of Reno and State of Kansas, have invented certain new and useful Improvements in Straw Spreaders for Harvester Thrashers, of which the following is a specification, reference being had to the accompanying drawings.

This invention relates to distributing or spreading devices, and particularly to means adapted to be mounted upon the straw discharge end of a combined harvester and thrasher whereby the straw, when it is discharged from the thrasher, shall be evenly and uniformly distributed over the ground.

The ordinary harvester thrasher discharges the straw in rows behind the machine about 3′ wide, this straw being taken ordinarily from a 12′ cut made by the harvester. It is difficult to secure the proper distribution of this straw over the land and this causes trouble in plowing.

The general object of my invention is to provide a spreader or distributer for the discharge end of a harvester thrasher which will spread the straw more evenly over the soil or land.

A further object is to provide a mechanism of this character which is simple in construction, and in which all parts are readily accessible, easly removed and put together.

A further object is to provide a construction of this character which is light in weight and which may be readily handled by one man.

And a further object is to provide a distributer of this character including a rotatable distributing bladed member on which the straw falls, the straw being thrown out and distributed evenly from this member by centrifugal force as the fan revolves.

A still further object is to provide means whereby the straw may be directed toward the center of the fan, which will give the fan a chance to throw the straw equally in all directions.

Another object is to provide means whereby the distributer may rise when it strikes the ground, thus preventing the distributer from being broken and whereby the lower edge of the canvas hood which discharges onto the distributer may also be lifted when the distributer rises.

Other objects will appear in the course of the following description.

My invention is illustrated in the accompanying drawings, wherein:—

Figure 1 is a side elevation of the rear end of a harvester-thrasher with my distributer applied thereto, the hood being partly broken away;

Figure 2 is a diagrammatic sectional view through the hood on a horizontal plane;

Figure 3 is a top plan view of my attachment;

Figure 4 is a fragmentary section on the line 4—4 of Figure 3;

Figure 5 is a section on the line 5—5 of Figure 4;

Figure 6 is a fragmentary detail sectional view of the rear end of the frame of my attachment showing the ground engaging shoe which supports the rear end of the distributer and hood when the shoe engages the ground.

Referring to the drawings, it will be seen that I have illustrated generally the rear end of a harvester thrasher with my device applied thereto. This rear end of the harvester thrasher includes upwardly extending and rearwardly, parallel members A attached at their lower ends to longitudinally extending frame bars B. These members A form the rear ends of the usual hub or housing and support a shaft C. Attached at intervals to these members is the hood 43 of canvas or like material which is operatively attached at its lower edge to a U-shaped hoop 43ª, this hoop being pivoted by a pivot bolt *a* or like member to the lateral frame bars B so that the lower margin of the hood may rise and fall. So far, the parts described are those commonly found on harvester thrashers.

My attachment comprises parallel angle irons 10, which at their forward ends are pivoted to the frame beams B by bolts 11, the forward ends of these frame bars 10 being notched to engage over the bolts. The rear ends of these frame bars 10 extend parallel to the ground. These frame bars 10 are supported by means of upwardly extending braces 12 which are pivoted by bolts 13, to the rear ends of the bars 10, and at their upper ends are formed with longitudinal slots 14 through which bolts 15 pass into the members A. This permits the rear ends of the bars 10 to rise or fall.

Connected to the rear ends of the bars 10 and extending transversely across these bars are transverse angle irons 16 and 17 which are braced by braces 18 bolted to the horizontal portion of the bars 10 and to the bars 16. Disposed in suitable bearings in the frame formed by the members 10, 16 and 17 and extending parallel to the members 16 and 17 is a shaft 19 which carries at its outer end a sprocket wheel 20 and at its inner end carries a bevelled gear wheel 21. The bearing for the inner end of the shaft 19 is formed by a sleeve, designated generally 22, and which is attached to and carried by the transverse bars 16 and 17 in any usual or suitable manner. The outer end of the shaft 19 is supported in a housing or bearing 23. The sprocket wheel 20 is connected by a sprocket chain 24 to a sprocket wheel 25 mounted on the shaft C. This sprocket chain 24 is held taut by a chain tightener arm 26 attached, at 27, to one of the members 10 and resiliently urged to a position tightening the chain 24 by means of a spring 28. This chain tightener arm carries a sprocket wheel 29 which engages the chain, and extending from the axis of this sprocket wheel is an arm 30 carrying a guide 31 for the upper flight of the chain 24. It will be seen that this chain tightener operates automatically to tighten the chain when the frame is raised as the chain would otherwise become slack. The bearing 22, as illustrated in detail in Figure 4, carries within it the vertical shaft 32, which carries on its lower end the bevelled gear wheel 33 meshing with the bevelled gear wheel 21 and driven therefrom. The shaft 32 extends beyond the vertical portion of the housing 22, and pinned to the upper end of this shaft or otherwise connected thereto for rotation therewith is a hub 34 having an enlarged head 35 formed with channel-shaped arms 36. Between this hub 34 and the upwardly extending portion of the bearing is a thrust or ball bearing washer 37.

Disposed in each arm 36 are wooden arms or extensions 38 which are pinned to the arms 36 by means of pins or bolts 39 and 40. Mounted upon the arms 38 and attached thereto is a hexagonal plate 41 which may be made of sheet metal, as for instance tin, and this plate is formed with a plurality of, as for instance six, radially extending, upwardly directed fan blades 42. The plate 41 may be of any desired diameter. Of course, it will be understood that suitable lubricating means is used for lubricating the bearings for the shaft 32 and for the shaft 19.

Extending downward from the members A is the canvas hood 43 which as hereinbefore stated forms a portion of the harvester thrasher, the lower edge of which terminates about on a line with the beams B. This canvas hood is formed with a hoop along its edge enclosed within the canvas and is detachably connected to the members A and has approximately the size of the frame formed by the members 10, 16, and 17 and is designed to direct the straw downward onto the distributer. The hoop of this canvas hood is pivoted by bolts 44 to the strap iron supports 12, and as these strap iron supports are slotted, as at 14, so that my attachment may rise and fall, it is obvious that as the attachment rises, the strap iron support will pull up the canvas, thus preventing the spreader fan from striking the canvas. Of course, the weight of the spreader frame and of the rotatable distributer will bring the parts back in place.

When the spreader is raised up by contact at the rear end with the ground, the chain tightening arm 26 will take up the slack in the chain. Disposed within the canvas hood 43 I have provided a curtain 45 which extends across each rear corner thereof. This curtain of canvas keeps the straw from falling straight down to the sides but directs it toward the center of the distributing fan. This gives the distributer or fan a chance to act equally on the straw in throwing it outward to thereby secure a proper distribution of the straw. It will be seen from Figures 1 and 2 that these curtains constitute, to a certain extent, a hopper within the hood and that this curtain extends downward and inward toward the center of the fan.

In order to prevent the gear 33 from touching the ground in case the rear end of the frame drops downward, I provide a runner or shoe 46 which is formed of strap iron and which is attached to the cross bar 16 and extends downward and forward and then downward and rearward and engages beneath the lower end of the shaft 32. This shoe 46 is adapted to engage the ground and will act to lift the distributer over projections, thereby preventing the breaking of the distributer. This shoe 46 will also prevent the dropping down of shaft 32 and gear wheel 33 when the pin or bolt 47 which holds the hub 34 to the shaft 32 is removed. It will be seen that by removing this single pin or bolt 47 that the shaft 32 may be readily removed from the bearing 22 and the head 34 with the distributer may be readily removed for repair or replacement.

The operation of this device will be obvious from what has gone before. The straw is discharged onto the rotatable distributer from the hood of the harvester thrasher, and then the straw is thrown outward by centrifugal force and uniformly scattered over the ground. The rapidity of rotation of the distributer may be governed by varying the size of the sprocket wheel 25. The sprocket wheel 25 which drives the wheel 20 is ordinarily furnished with the harvester thrasher.

It will be seen that my device is very simple in construction and that all the parts are readily accessible, easily removed and easily put together. Furthermore, the entire structure is light in weight, weighing in actual practice approximately 80 pounds. Thus one man can easily handle the spreader and can attach it or remove it without help in a few minutes. The distributer takes very little power, and only two bolts 15 have to be entirely removed in order to remove the spreader. The bars 10 may be then lifted off of bolts 11. The rotatable distributer itself may be removed by simply pulling out the pin or bolt 47. This might be necessary when it is desired to change the sieves, screens, or to do other work beneath the canvas hood 43.

While I have illustrated a construction which I have found to be thoroughly effective in actual practice, I do not wish to be limited to this, as it is obvious that many changes might be made in the details of construction and arrangement of parts without departing from the spirit of the invention.

I claim:—

1. A distributer attachment for harvester thrashers comprising a supporting frame adapted to be detachably and pivotally mounted upon the rear end of the harvester thrasher for vertical oscillation, braces connected to the rear end of said frame and at their upper ends having sliding engagement with the rear end of the harvester thrasher and limiting the vertical oscillation of the frame, a hood of flexible material attached to the rear end of the harvester thrasher and extending downward around and attached to said frame, a distributer rotatably mounted upon the rear end of the frame beneath the hood, means affording a driving connection between the distributer and the driving mechanism of the harvester thrasher and permitting upward movement of the rear end of the frame, and a ground engaging shoe operatively mounted upon the supporting frame, whereby to cause the vertical oscillation of the free end of the supporting frame and the distributer.

2. A distributing attachment for harvester thrashers comprising a frame formed of longitudinally extending members and transverse members at the rear ends thereof, the longitudinally extending members being adapted to be pivotally and detachably connected to the rear end of the harvester thrasher, braces longitudinally slotted at their upper ends for pivotal and limited sliding connection to the rear end of the harvester thrasher and pivotally connected to the rear ends of the first named members, a transverse shaft supported upon the rear end of the frame and carrying a sprocket wheel, a distributer mounted upon the rear end of the frame and operatively connected to the first named shaft, means for directing material downward from the rear end of the harvester thrasher and upon the distributer, and a shoe operatively connected to the distributer frame and adapted to engage with the ground, whereby to cause the vertical oscillation of the free end of the supporting frame and the distributer in conformity with the irregularities in the ground.

3. A distributing attachment for harvester thrashers comprising a frame formed of longitudinally extending members and transverse members at the rear ends thereof, the longitudinal members being adapted to be pivotally and detachably connected to the rear end of the harvester thrasher, braces longitudinally slotted at their upper ends for pivotal and sliding connection to the rear end of the harvester thrasher and pivotally connected to the rear ends of the first named members, a transverse shaft supported upon the rear end of the frame and carrying a sprocket wheel, a straw distributer mounted upon the rear end of the frame and operatively connected to the first named shaft, a hood detachably attached to the rear end of the harvester thrasher and extending downward around said frame, and means within the hood for directing the straw to the center of the distributer.

4. The combination with a harvester thrasher, of a frame pivotally connected to the rear end thereof for oscillation in a vertical plane, a rotatable distributer mounted upon the frame, means for driving said distributer including a transverse shaft having a sprocket wheel, a driving sprocket wheel mounted upon the harvester thrasher, a sprocket chain connecting said sprocket wheels, and a belt tightener mounted upon said frame and acting to take up the slack in the sprocket chain when the rear end of the frame is oscillated, and a ground engaging member operatively connected to the rear end of the pivoted frame to cause the oscillation thereof in conformity with the irregularities in the ground.

5. The combination with a harvester thrasher and a distributing attachment therefor comprising a frame pivoted at its forward end to the rear end of the harvester thrasher for oscillation in a vertical plane, a rotatable distributer mounted upon said frame and operatively connected to the driving gearing of the harvester thrasher, and a hood attached to the rear end of the harvester thrasher and extending downward around said frame, said hood having its lower end operatively connected to the frame to rise or fall as the frame oscillates vertically.

6. The combination with a vehicle having a flexible hood depending from its rear end and discharging downward, a hoop pivoted to the vehicle and to which the lower end of the hood is connected, of a distributer supporting frame pivotally connected to the frame of the vehicle for vertical oscillation and extending below the hood, an operative connection between said frame and the hoop of the hood whereby the frame and hoop may oscillate vertically together, a distributer mounted upon said frame beneath the hood, means for driving the distributer, and a ground engaging shoe carried by the distributer frame and adapted to oscillate the frame in accordance with the irregularities in the ground.

7. The combination with a harvester thrasher having a downwardly discharging hood of flexible material at its rear, of a straw distributer rotatable in a horizontal plane and disposed beneath the hood, means operatively connecting the distributer to the driving mechanism of said thrasher, means pivotally connected to the frame for vertical oscillation and supporting the distributer, and a curtain arranged within said hood and extending across each rear corner thereof and adapted to direct the straw passing downward through the hood upon the axial center of said distributer.

In testimony whereof I hereunto affix my signature.

EDWARD H. LINSCHEID.